United States Patent [19]

Marson

[11] Patent Number: 4,576,321

[45] Date of Patent: Mar. 18, 1986

[54] APPARATUS FOR CONNECTING A STRIP OF PHOTOGRAPHIC PAPER TO A FLAT CONVEYOR BELT

[75] Inventor: Roberto Marson, Pordenone, Italy

[73] Assignee: Gretag San Marco S.p.A., Pordenone, Italy

[21] Appl. No.: 515,172

[22] Filed: Jul. 19, 1983

[30] Foreign Application Priority Data

Jul. 20, 1982 [IT] Italy .............................. 34031/82[U]

[51] Int. Cl.[4] ........................ B65H 17/34; G03B 3/13

[52] U.S. Cl. ...................................... 226/173; 24/344; 226/92; 354/319

[58] Field of Search ................... 24/344, 620, DIG. 8, 24/346, 349, 457, 343, 345; 226/173, 92, 163, 167; 354/312, 319, 320, 321, 322, 340, 343, 344, 345, 346; 269/97, 98, 136; 294/145, 162, 164, 99.1, 99.2; 198/688, 694

[56] References Cited

U.S. PATENT DOCUMENTS

| | | | |
|---|---|---|---|
| 773,254 | 10/1904 | Gunn | 24/345 |
| 2,381,815 | 8/1945 | Filburn | 269/136 |
| 2,530,821 | 11/1950 | Hubbell | 24/DIG. 8 |
| 2,770,179 | 11/1956 | Dye et al. | 354/320 X |
| 2,878,924 | 3/1959 | Dye et al. | 354/321 X |
| 3,586,226 | 6/1971 | Nippert, Sr. | 226/163 X |
| 3,713,649 | 1/1973 | Van Kempen et al. | 226/92 X |
| 4,065,042 | 12/1977 | Zielinski | 354/321 X |
| 4,072,260 | 2/1978 | Dove | 354/345 X |
| 4,188,108 | 1/1980 | Falomo | 354/345 |
| 4,279,371 | 7/1981 | Laar et al. | 226/173 X |

*Primary Examiner*—Robert W. Jenkins
*Assistant Examiner*—Scott J. Haugland
*Attorney, Agent, or Firm*—Wenderoth, Lind & Ponack

[57] ABSTRACT

An apparatus for connecting a strip of photographic paper to a flat conveyor belt includes an elongated member having at a first end thereof a hook for fitting over one edge of the flat conveyor belt. The elongated member has a supporting portion spaced from the hook and adapted to have attached thereto a strip of photographic material. A slide member is mounted for longitudinal sliding movement along a portion of the length of the elongated member between the hook and the supporting portion thereof. The slide member has projecting therefrom an integral inclined tab for engaging the other edge of the flat conveyor belt. A toggle and spring structure constantly urge the slide member toward the hook, thereby ensuring that opposite edges of the conveyor belt continuously are clamped between the hook and the tab.

3 Claims, 4 Drawing Figures

APPARATUS FOR CONNECTING A STRIP OF PHOTOGRAPHIC PAPER TO A FLAT CONVEYOR BELT

BACKGROUND OF THE INVENTION

The present invention relates to an apparatus for mounting or connecting a strip of material to a flat conveyor belt employed to convey the strip along a path. The present invention more particularly is directed to such an apparatus for mounting or connecting a strip of photographic paper to a flat conveyor belt employed to convey the strip through a developing machine, and specifically several baths therein containing various chemicals required to develop the photographic paper. It is to be understood however that it is contemplated that the apparatus of the present invention be employed for other specfic uses and environments.

A known apparatus for mounting or connecting a strip of photographic paper to a flat conveyor belt includes a hooked rod for engagement with the conveyor belt, and an elastic clasp for clamping the belt onto the rod engaged by the hooked portion of the rod. This type of device suffers from certain inherent difficulties during the phase of release of the strip of photographic paper and further does not ensure a constant gripping action after continued use due to wearing of the belt.

SUMMARY OF THE INVENTION

With the above discussion in mind, it is an object of the present invention to provide an apparatus for mounting or connecting a strip of material to a flat conveyor belt employed to convey the strip along a path, whereby it is possible to overcome the above and other prior art disadvantages.

It is a more specific object of the present invention to provide an apparatus for mounting or connecting a strip of photographic paper to a flat conveyor belt employed to convey the strip through a developing machine.

It is a further object of the present invention to provide such an apparatus which is more convenient to use than prior art devices and which takes advantage of the elasticity of the material of the flat conveyor belt in order to ensure continuously a condition of firm connection, even after extended use of the apparatus and the flat conveyor belt.

These objects are achieved in accordance with the present invention by the provision of an elongated member having at a first end thereof a hook for fitting over one edge of a flat conveyor belt. The elongated member has a supporting portion spaced from the hook and adapted to have attached thereto, in an otherwise known manner, a strip of material, for example a strip of photographic material. A slide member is mounted for longitudinal sliding movement along a portion of the length of the elongated member between the hook and the supporting portion. The slide member has projecting therefrom means for engaging the other or opposite edge of the flat conveyor belt. The slide member is movable along the elongated member between an open or retracted position relatively away from the hook, whereat the conveyor belt may be introduced between the hook and the engaging means, and a clamping position relatively toward the hook, whereat respective opposite edges of the conveyor belt are engaged by the hook and the engaging means. Structure is provided for urging the slide member constantly toward the clamping position thereof, whereby the slide member may be moved manually or automatically against the force of the urging structure away from the clamping position and to the open position, whereby the apparatus may be removed from or applied to the flat conveyor belt.

The engaging means preferably comprises an inclined tab integral wth the slide member and projecting therefrom in a direction generally toward the hook.

The urging structure preferably is spring-biased and may include first and second levers, in the form of a toggle arrangement, hinged to each other and hinged respectively to the elongated member and to the slide member. A spring, for example a torsion spring, acts between the second lever and the slide member to move the slide member toward the clamping position thereof.

In accordance with another feature of the present invention, that portion of the elongated member between the hook and the slide member and adapted to face the flat conveyor belt is generally plate-shaped and has extending therefrom a raised portion to contact the conveyor belt at a position between the opposite edges thereof, thereby imparting a slightly transverse curve to the conveyor belt, thereby facilitating maintaining the belt between the hook and the engaging means.

BRIEF DESCRIPTION OF THE DRAWINGS

The above and other objects, features and advantages of the present invention will be discussed in more detail below, with reference to the accompanying drawings, wherein.

DETAILED DESCRIPTION OF THE INVENTION

With reference to the drawings, the apparatus of the present invention includes an elongated member 10 having at a first end thereof a hook 17 for fitting over one edge of a flat conveyor belt 12. Elongated member 10 has a supporting portion, shown in the right sides of the drawings, spaced from hook 17 and adapted to have attached thereto, in an otherwise known manner, a strip 11, for example a strip of photographic material. Those skilled in the art will understand how the strip 11 is supported by or attached to the supporting portion of the elongated member 10.

Figure 2:
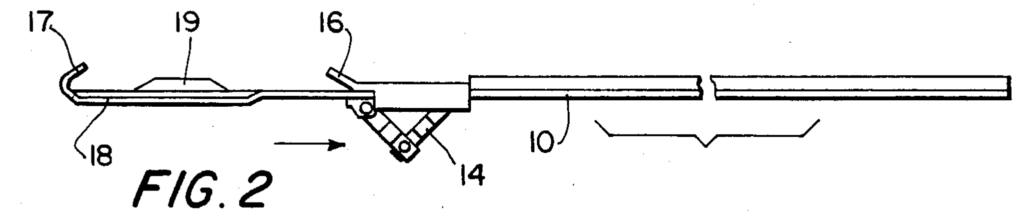
FIGS. 2 through 4 are side views of the apparatus shown in various operative positions thereof.

A slide member 13 is mounted for longitudinal sliding movement along a portion of the length of elongated member 10 between hook 17 and the supporting portion. Slide member 13 may be mounted on elongated member 10 by any convenient manner, but the illustrated arrangement including bent under flanges is particularly advantageous. Slide member 13 has projecting therefrom an inclined tab 16 integral with slide member 13 and projecting therefrom generally toward the hook 17. Inclined tab 16 is operable to engage the opposite or other edge of the flat conveyor belt 12, as shown particularly in FIGS. 3 and 4. Slide member 13 is movable along elongated member 10 between an open position [FIG. 2] relatively away from hook 17, whereat the conveyor belt 12 may be introduced between the hook 17 and the tab 16, and a clamping position [FIG. 4] relatively toward the hook 17, whereat respective opposite edges of the conveyor belt 12 are engaged by the hook 17 and the tab 16.

The apparatus of the invention includes structure for urging slide member 13 constantly toward the clamping position thereof, i.e. toward hook 17. In the illustrated preferred embodiment of the present invention, such structure is spring-biased and includes a pair of levers 14 arranged in a toggle configuration and hinged to each other and hinged respectively to elongated member 10 and to slide member 13. A spring, for example a torsion spring 15, acts between one lever 14 and the slide member 13 to cause the toggle structure to be flattened, and thereby to move slide member 13 toward the clamping position thereof.

In accordance with another feature of the present invention, at least that portion of elongated member 10 between the hook 17 and the slide member 13 is of a generally plate-shaped configuration, as shown at 18. In the actually illustrated arrangement, the portion of elongated member 10 between the portion supporting the strip 11 and the hook 17 is generally plate-shaped, and the supporting portion is generally in the shape of a flattened rod. However, such configuration is intended to be illustrative and preferred only, and it will be apparent that various other configurations of elongated member 10 could be employed. Extending upwardly from plate-shaped portion 18 is a raised portion 19 which acts, as illustrated particularly in FIG. 4 of the drawings, to contact a laterally center portion of conveyor belt 12, thereby causing a lateral curvature in belt 12, and thereby tending to ensure that the opposite edges of the belt are retained between hook 17 and tab 16.

Although it is believed that the manner of operation of the apparatus of the present invention is apparent from the above discussion, such operation now will be briefly described.

Figure 1:
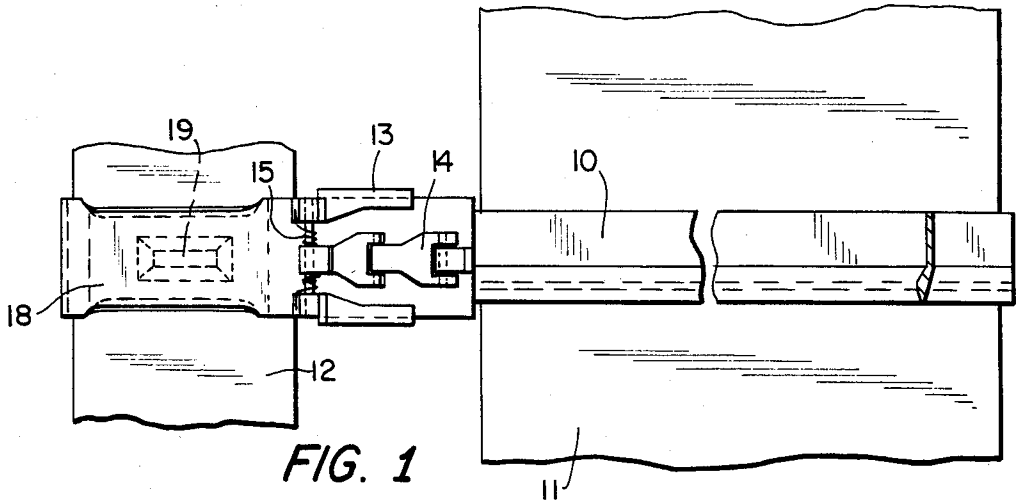
FIG. 1 is a plan view of the apparatus of the present invention.
Figure 3:
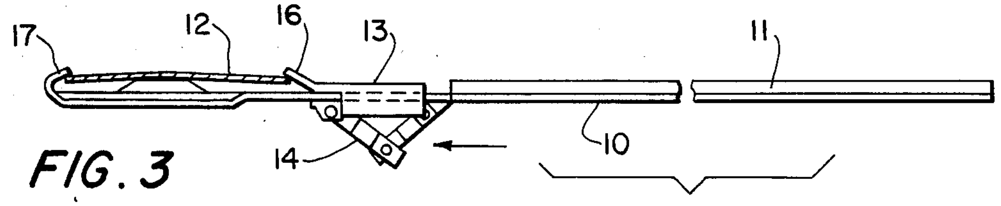
Figure 4:
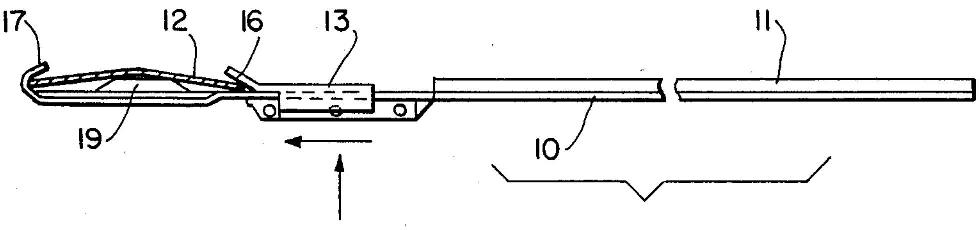

First, a photographic paper strip 11 is attached in a known manner to the supporting portion of elongated member 10, as shown in FIG. 1. The slide member 13 is then moved against the force of spring 15 to the open position shown in FIG. 2. This enables the apparatus to be positioned with respect to flat conveyor belt 12 such that the edges of the belt are positioned between hook 17 and tab 16. The pressure urging slide member 13 to the open position thereof then is released, at which time spring 15 causes slide member 13 to commence moving toward the clamping position thereof, as shown in FIG. 3. The force of spring 15 causes slide member 13 to continue movement toward the clamping position thereof until the opposite edges of the belt are clamped between hook 17 and tab 16, as shown in FIG. 4. At this time also, a slight curvature is imparted to belt 12 by means of raised portion 19.

The opening and closing of the toggle structure and the slide member are relatively simple and easy, and such movements may be achieved manually or may be automated by means of any type of exterior pressure device which would be well within the knowledge of one skilled in the art. Furthermore, the apparatus of the present invention is extremely reliable over continuous use of the apparatus connected to a flat conveyor belt, since the conveyor belt is compressed between its side edges, rather than between opposite major surfaces thereof as is done in the prior art. This not only results in less wear to the belt, but the elasticity of the material of the belt itself, acting against the force of spring 15, ensures a continuous tight attachment and self-adjusting structure during continued operation and wear of the belt.

Although the present invention has been described and illustrated with respect to a preferred embodiment thereof, it is to be understood that various changes and modifications may be made to the specifically described and illustrated structure without departing from the scope of the present invention.

I claim:

1. An apparatus for connecting a strip of material to a flat conveyor belt employed to convey the strip along a path, said apparatus comprising:

an elongated member having a first end thereof hook means for fitting over one edge of a flat conveyor belt, said elongated member having a supporting portion spaced from said hook means and adapted to have attached thereto a strip of material;

a slide member mounted for longitudinal sliding movement along a portion of the length of said elongated member between said hook means and said supporting portion, said slide member having projecting therefrom means for engaging the other edge of the flat conveyor belt, said slide member being movable along said elongated member between an open position relatively away from said hook means, whereat the conveyor belt may be introduced between said hook means and said engaging means, and a clamping position relatively toward said hook means, whereat respective opposite edges of the conveyor belt are engaged by said hook means and said engaging means; and means for urging said slide member constantly toward said clamping position thereof, said urging means comprising first and second levers hinged to each other and hinged respectively to said elongated member and to said slide member, and a spring acting between said second lever and said slide member to move said slide member to said clamping position thereof.

2. An apparatus as claimed in claim 1, wherein said engaging means comprises an inclined tab integral with said slide member and projecting therefrom generally toward said hook means.

3. An apparatus as claimed in claim 1, wherein that portion of said elongated member between said hook means and said slide member is generally plate-shaped and has extending therefrom a raised portion to contact a portion of the conveyor belt between the opposite edges thereof.

* * * * *